United States Patent
Wu et al.

(10) Patent No.: US 8,738,263 B2
(45) Date of Patent: May 27, 2014

(54) METHOD OF DETECTING A VEHICLE SPEED AND RELATED ELECTRONIC DEVICE

(75) Inventors: Tung-Ming Wu, New Taipei (TW); Meng-Kai Lin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/609,227

(22) Filed: Sep. 10, 2012

(65) Prior Publication Data

US 2013/0332040 A1   Dec. 12, 2013

(30) Foreign Application Priority Data

Jun. 11, 2012   (TW) .............................. 101120923 A

(51) Int. Cl.
*G06F 7/70* (2006.01)
*G01S 13/08* (2006.01)
*G01S 13/58* (2006.01)

(52) U.S. Cl.
USPC .............. 701/70; 342/104; 342/112; 342/116

(58) Field of Classification Search
USPC ................... 701/71, 70; 342/104, 112, 116
See application file for complete search history.

(56) References Cited

U.S. PATENT DOCUMENTS

| 4,740,045 | A | * | 4/1988 | Goodson et al. | 342/112 |
| 5,691,724 | A | * | 11/1997 | Aker et al. | 342/104 |
| 5,784,023 | A | * | 7/1998 | Bluege | 342/104 |
| 7,242,462 | B2 | | 7/2007 | Huang | |
| 2009/0279070 | A1 | | 11/2009 | Ueno | |
| 2011/0227782 | A1 | | 9/2011 | Tseng | |
| 2011/0241923 | A1 | * | 10/2011 | Chernukhin | 342/20 |
| 2012/0280855 | A1 | * | 11/2012 | Moulton et al. | 342/159 |

FOREIGN PATENT DOCUMENTS

| CN | 101203729 B | 7/2011 |
| TW | 200622250 | 7/2006 |
| TW | 201018946 | 5/2010 |

OTHER PUBLICATIONS

Office action mailed on Dec. 26, 2013 for the Taiwan application No. 101120923, filing date: Jun. 11, 2012, p. 1 line 12~14, p. 2 line 1~8 and 11~26, p. 3~6, p. 7 line 1~25 and search report.

* cited by examiner

*Primary Examiner* — Thomas Black
*Assistant Examiner* — Tyler Paige
(74) *Attorney, Agent, or Firm* — Winston Hsu; Scott Margo

(57) ABSTRACT

A method of detecting a vehicle speed is disclosed in the present invention. The method includes outputting a detecting wave, receiving a reflecting wave from an external object when the external object passes through a covering range of the detecting wave, calculating a variation between the detecting wave and the reflecting wave, and reading a table for executing an application program according to information of the table.

20 Claims, 4 Drawing Sheets

METHOD OF DETECTING A VEHICLE SPEED AND RELATED ELECTRONIC DEVICE

BACKGROUND OF THE INVENTION

1. Field of the Invention

The present invention relates to a method of detecting a vehicle speed and a related electronic device, and more particularly, to an electronic device disposed on a movable emitter for detecting a speed of an external object and a related method.

2. Description of the Prior Art

An operation recorder is a widespread application to be installed on a vehicle, such as a minibus, a container car and a tourist bus. The vehicle operation recorder can record environment information by image and sound when the vehicle moves. As an accident happens, information stored inside the vehicle operation recorder can be utilized to judge illegal duty. However, the conventional vehicle operation recorder is always used after the accident, and can not prevent the accident. Then, design of a new type vehicle operation recorder capable of simultaneously recording the environment information and detecting an approaching vehicle for preventing the hit accident is an important issue to keep travel safety.

SUMMARY OF THE INVENTION

The present invention provides an electronic device disposed on a movable emitter for detecting a speed of an external object and a related method for solving above drawbacks.

According to the claimed invention, a method of detecting a vehicle's speed is disclosed. The method includes outputting a detecting wave, receiving a reflecting wave from an external object when the external object passes through a covering range of the detecting wave, calculating a frequency variation between the detecting wave and the reflecting wave, and reading a table for executing an application program according to the frequency variation and information of the table.

According to the claimed invention, executing the application program according to the frequency variation and the information of the table includes outputting a warning signal when the frequency variation is positive.

According to the claimed invention, executing the application program according to the frequency variation and the information of the table includes calculating a speed variation between the external object and an emitter outputting the detecting wave by a Doppler formula, reading a moving speed of the emitter from a processor of the emitter, and calculating and displaying a moving speed of the external object according to the speed variation and the moving speed of the emitter.

According to the claimed invention, outputting the warning signal includes driving the emitter to generate an acoustic wave or an optical wave when the frequency variation is greater than a first threshold value and smaller than a second threshold value, and decelerating a moving speed of the emitter when the frequency variation is greater than the second threshold value. The second threshold value is substantially greater than the first threshold value.

According to the claimed invention, a frequency or an intensity of the acoustic wave and the optical wave is adjusted according to a value of the frequency variation.

According to the claimed invention, executing the application program according to the frequency variation and the information of the table includes calculating a speed variation between the external object and an emitter outputting the detecting wave by a Doppler formula when the frequency variation is negative, reading a moving speed of the emitter from a processor of the emitter, and calculating and displaying a moving speed of the external object according to the speed variation and the moving speed of the emitter.

According to the claimed invention, the table comprises a plurality of threshold values and a plurality of application programs, each application program is executed when the frequency variation is within a range of the corresponding threshold value.

According to the claimed invention, the plurality of application programs comprises functions of generating an acoustic wave or an optical wave by an emitter with detecting wave transmission, and decelerating a moving speed of the emitter.

According to the claimed invention, an electronic device disposed on an emitter for detecting a moving speed of an external object is disclosed. The electronic device includes a wireless signal transceiver, a memory module and a control unit. The wireless signal transceiver outputs a detecting wave and receives a reflecting wave from an external object when the external object passes through a covering range of the detecting wave. The memory module can store a table. The table includes a plurality of threshold values and a plurality of application programs. The control unit is electrically connected to the wireless signal transceiver and the memory module, and further coupled to the emitter in an external connection. The control unit calculates a frequency variation between the detecting wave and the reflecting wave, reads the table, and executes the corresponding application program according to the frequency variation and the threshold value. Each application program is executed when the frequency variation is within a range of the corresponding threshold value, and the electronic device is a vehicle operation recorder.

According to the claimed invention, an electronic device disposed on an emitter for detecting a moving speed of an external object is disclosed. The electronic device includes a wireless signal transceiver, a memory module and a control unit. The wireless signal transceiver outputs a detecting wave and receives a reflecting wave from an external object when the external object passes through a covering range of the detecting wave. The memory module can store a table. The table includes a plurality of threshold values and a plurality of application programs. The control unit is electrically connected to the wireless signal transceiver and the memory module, and further coupled to an internal circuit of the emitter in a built-in manner. The control unit calculates a frequency variation between the detecting wave and the reflecting wave, reads the table, and executes the corresponding application program according to the frequency variation and the threshold value. Each application program is executed when the frequency variation is within a range of the corresponding threshold value, and the electronic device is a vehicle operation recorder.

The electronic device of the present invention can overcome drawbacks of the conventional vehicle operation recorder. The present invention not only can record the environment information by image and sound, but also can simultaneously detect the speed of the approaching vehicle, so as to generate the warning signal or to actuate the brake system for the proper safety protection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
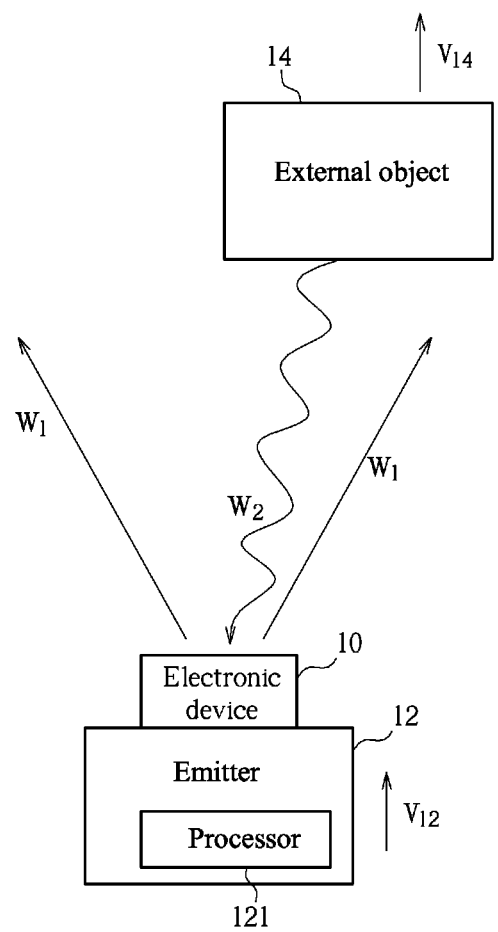
FIG. 1 is a diagram of an electronic device according to an embodiment of the present invention.

Please refer to FIG. 1. FIG. 1 is a diagram of an electronic device 10 according to an embodiment of the present invention. The electronic device 10 can be a vehicle operation recorder, which records environment information by image and sound when the vehicle moves. The electronic device 10 can be installed on an emitter 12 (the vehicle). The emitter 12 can include a processor 121, the processor 121 can detect a moving speed $V_{12}$ of the emitter 12, and the electronic device 10 can be electrically connected to the processor 121 to obtain a value of the moving speed $V_{12}$. The electronic device 10 of the present invention not only can record image and sound, but also can utilize a Doppler formula to detect a moving speed $V_{14}$ of an external object 14, which is close to the emitter 12. The external object 14 can be an approaching vehicle. The electronic device 10 can output a prompting message when the external object 14 moves close to or far from the emitter 12, so as to improve travel safety.

Figure 2:
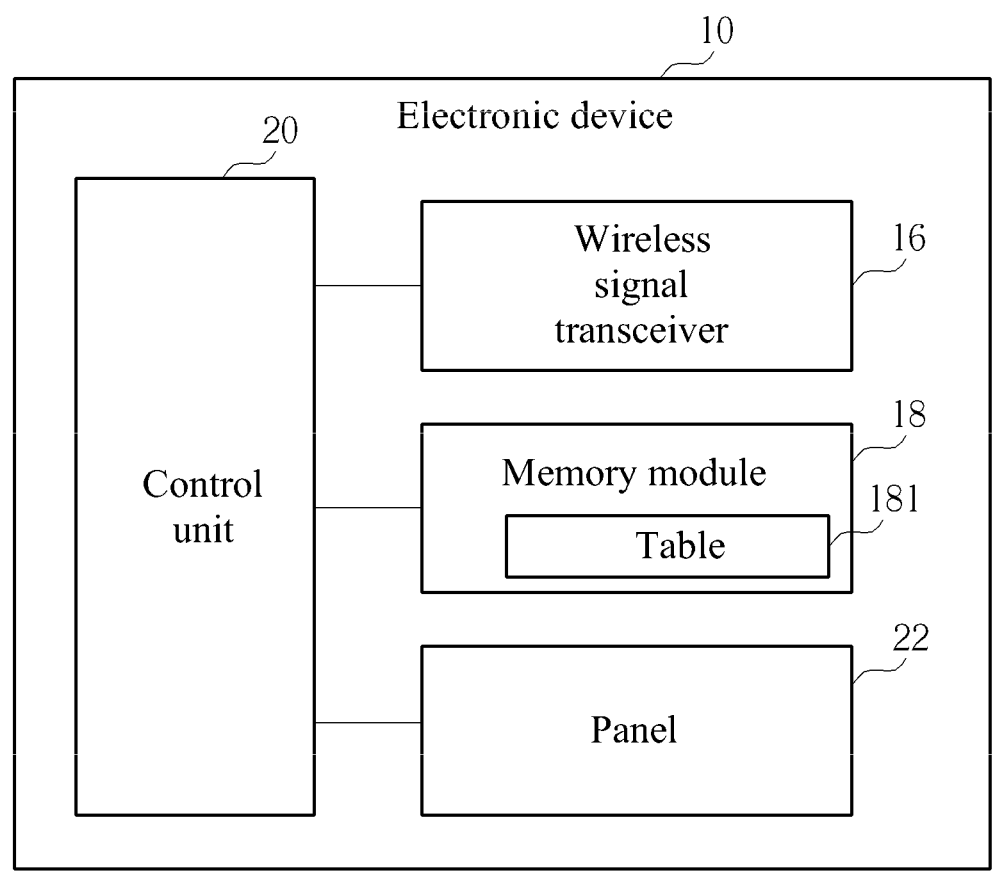
FIG. 2 is a functional block diagram of the electronic device according to the embodiment of the present invention.

Please refer to FIG. 1 and FIG. 2. FIG. 2 is a functional block diagram of the electronic device 10 according to the embodiment of the present invention. The electronic device 10 includes a wireless signal transceiver 16, a memory module 18, a control unit 20 and a panel 22. The wireless signal transceiver 16 can output a detecting wave W1 along a moving direction of the electronic device 10 (the emitter 12). The external object 14 moves toward the emitter 12 can pass through a covering range of the detecting wave W1 from the electronic device 10. A reflecting wave W2 can be generated from the external object 14 when the detecting wave W1 contacts the external object 14. The reflecting wave W2 can move along a direction opposite to a moving direction of the detecting wave W1, and be received by the wireless signal transceiver 16. A table 181 is stored in the memory module 18. The table 181 can include a plurality of threshold values T and a plurality of application programs F. The plurality of threshold values T can be class intervals of frequency variation Δf between the detecting wave W1 and the reflecting wave W2, and the plurality of application programs F can generate warning signals by different forms.

The control unit 20 is electrically connected to the wireless signal transceiver 16, the memory module 18 and the panel 22. It should be mentioned that the control unit 20 can be coupled to the emitter 12 in an external connection or be coupled to an internal circuit of the emitter 12 in a built-in manner, selectively. The control unit 20 can analyze and calculate the frequency variation Δf between the detecting wave W1 and the reflecting wave W2, and simultaneously read information in the table 181. Each application program F conforms to a range of the corresponding threshold value T. The control unit 20 can select one of the threshold values T according to the frequency variation Δf by calculation, and execute the application program conforming to the selected threshold value T, so as to remind a user of the approaching external object 14. In addition, the control unit 20 can calculate speed variation ΔV between the emitter 12 and the external object 14 by the Doppler formula with the frequency variation Δf, and further can calculate a real speed of the external object 14 for displaying on the panel 22.

Figure 3:
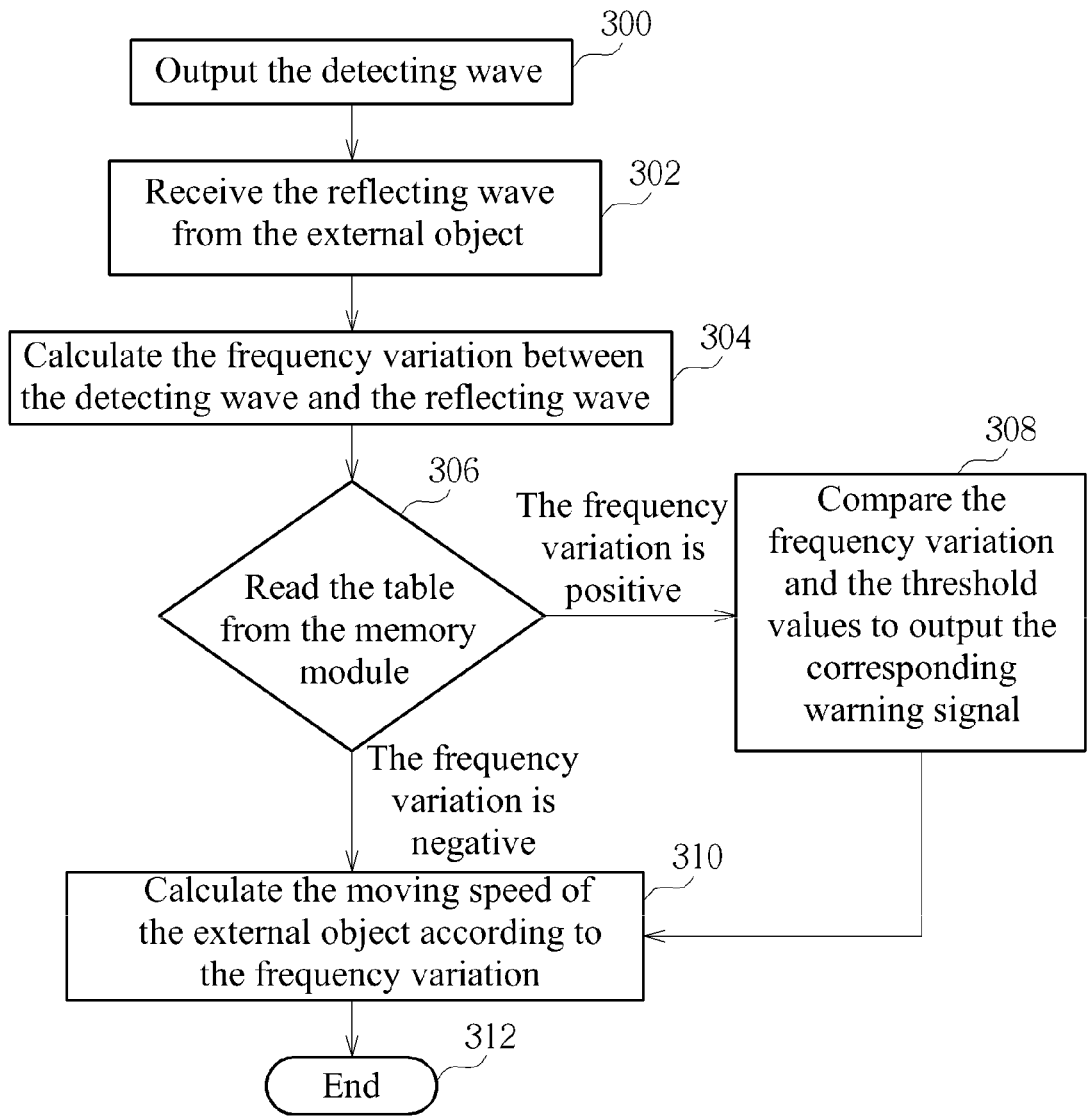
FIG. 3 is a flow chart of detecting the vehicle's speed by the electronic device according to the embodiment of the present invention.

Please refer to FIG. 3. FIG. 3 is a flow chart of detecting the vehicle's speed by the electronic device 10 according to the embodiment of the present invention. The method includes following steps:

Step 300: Utilize the wireless signal transceiver 16 to output the detecting wave W1.

Step 302: The wireless signal transceiver 16 receives the reflecting wave W2 from the external object 14 when the external object 14 passes through the covering range of the detecting wave W1.

Step 304: The control unit 20 calculates the frequency variation Δf between the detecting wave W1 and the reflecting wave W2.

Step 306: The control unit 20 reads the table 181 from the memory module 18. Execute step 308 when the frequency variation Δf is positive; Execute step 310 when the frequency variation Δf is negative.

Step 308: The control unit 20 compares the frequency variation Δf and the plurality of threshold values T to output the corresponding warning signal. And then execute step 310.

Step 310: The control unit 20 calculates the moving speed $V_{14}$ of the external object 14 according to a value of the frequency variation Δf.

Step 312: End.

Detailed description is introduced as following. The electronic device 10 of the present invention utilizes the wireless signal transceiver 16 to output the detecting wave W1. The detecting wave W1 can be radially transmitted outward to form a fan-shaped covering range. As the external object 14 moves into the covering range, the reflecting wave W2 can be generated from the external object 14, and move along the direction opposite to the moving direction of the detecting wave W1 for being received by the wireless signal transceiver 16. After, the control unit 20 can be actuated to calculate the frequency variation Δf between the detecting wave W1 and the reflecting wave W2, and connect to the memory module 18 to read the table 181. The control unit 20 can find out the speed variation ΔV between the emitter 12 and the external object 14 in the table 181 according to the value of the frequency variation Δf, and further can determine whether the frequency variation Δf is positive or negative, so as to execute the corresponding application program according to predetermined information of the table 181, such as outputting the warning signal.

For example, a distance between the emitter 12 and the external object 14 is decreased when the frequency variation Δf is positive, so the control unit 20 ca drive the emitter 12 to output the warning signal for reminding the user of the approaching vehicle (which means the external object 14). The warning signal can be an acoustic wave and an optical wave. The acoustic wave can be generated by a horn, and the optical wave can be generated by a lamp. A frequency or an intensity of the acoustic wave and the optical wave can be adjusted according to the values of the frequency variation Δf. Further, the table 181 can include a first threshold value T1 and a second threshold value T2, and the second threshold value T2 is substantially greater than the first threshold value T1. When the frequency variation Δf is greater than the first threshold value T1 and smaller than the second threshold value T2, the distance between the emitter 12 and the external object 14 is decreased, so that the control unit 20 can drive the emitter 12 to generate the acoustic wave or the optical wave, so that the user can pay attention to the approaching vehicle (the external object 14). Frequency and sound volume of the horn, or intensity variation and scintillating frequency of the lamp can be increased and decreased according to the value of the frequency variation $\Delta f$, which can be directly proportional to the distance between the emitter 12 and the external object 14. As the frequency variation $\Delta f$ is greater than the second threshold value T2, the emitter 12 may be more close to the external object 14. The control unit 20 can actuate a brake system of the emitter 12 for decelerating the moving speed $V_{12}$, so as to prevent a hit accident between the emitter 12 and the external object 14.

Figure 4:
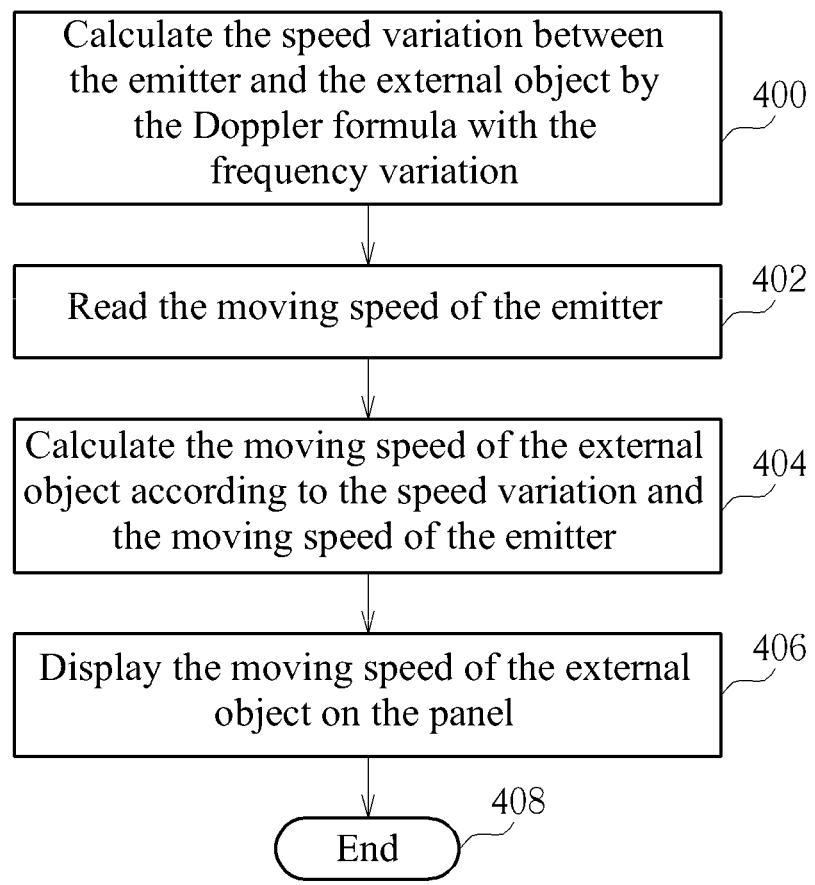
FIG. 4 is a flow chart of calculating the moving speed of the external object according to the embodiment of the present invention.

Please refer to FIG. 4. FIG. 4 is a flow chart of calculating the moving speed $V_{14}$ of the external object 14 according to the embodiment of the present invention. The method includes following steps:

Step 400: Calculate the speed variation $\Delta V$ between the emitter 12 and the external object 14 by the Doppler formula with the frequency variation $\Delta f$.

Step 402: Connect to the processor 121 for reading the moving speed $V_{12}$ of the emitter 12.

Step 404: Calculate the moving speed $V_{14}$ of the external object 14 according to the speed variation $\Delta V$ and the moving speed $V_{12}$ of the emitter 12.

Step 406: Display the moving speed $V_{14}$ of the external object 14 on the panel 22.

Step 408: End.

The control unit 20 can calculate the speed variation $\Delta V$ between the emitter 12 and the external object 14 by the Doppler formula with the frequency variation $\Delta f$, such as utilizing a substitution method. Because the speed variation $\Delta V$ represents a speed difference between the emitter 12 and the external object 14, which does not conform to the read speed of the external object 14, so that the control unit 20 can connect to the processor 121 to obtain the moving speed $V_{12}$ of the emitter 12, add up the speed variation $\Delta V$ and the moving speed $V_{12}$ for getting the moving speed $V_{14}$ (the read speed) of the external object 14. Final, the control unit 20 can selectively display the moving speed $V_{14}$ on the panel 22, and the user can view the information to decide proper reaction.

TABLE 181

| Tx | Rx | $\Delta f$ | $\Delta V$ | T | F |
|---|---|---|---|---|---|
| 10 MHz | 30 MHz | 20 MHz | 40 km/s | T1 | Warning |
|  | 120 MHz | 110 MHz | 120 km/s | T2 | Braking |

As mentioned above, the table 181 can include an emitting frequency Tx of the detecting wave W1, a receiving frequency Rx of the reflecting wave W2, the frequency variation $\Delta f$, the speed variation $\Delta V$, the threshold values T and application programs F. Generally, the emitting frequency Tx of the detecting wave W1 emitted by the wireless signal transceiver 16 of the electronic device 10 is a constant value, and the receiving frequency Rx of the reflecting wave W2 received by the wireless signal transceiver 16 is a variable value. The control unit 20 can calculate the frequency variation $\Delta f$ and the speed variation $\Delta V$ according to a difference between the emitting frequency Tx and the receiving frequency Rx. The threshold values T and application programs F are predesigned parameters of the electronic device 10, which can be amended according to user's demand.

For purposes of the speed detection and the travel safety of the present invention, the control unit 20 can compare the frequency variation $\Delta f$ with the threshold value T (or compare the speed variation $\Delta V$ with the threshold value T), to find out which the threshold value T conforms to the speed variation $\Delta V$, such as the first threshold value T1 or the second threshold value T2, for executing the corresponding application program F, such as actuating the horn, the lamp or the break system. Each application program is executed when the frequency variation $\Delta f$ is within a range of the corresponding threshold value T. It is to say, the electronic device 10 drives the emitter 12 to generate the acoustic wave or the optical wave when the frequency variation $\Delta f$ corresponds to the first threshold value T1. The electronic device 10 further decelerates the moving speed $V_{12}$ of the emitter 12 when the frequency variation $\Delta f$ corresponds to the second threshold value T2, in the meantime the emitter 12 rapidly approaches the external object 14, and the application program corresponds to the second threshold value T2 can actuate the brake system, so as to effectively prevent the hit accident between the emitter 12 and the external object 14.

In conclusion, the electronic device of the present invention can be disposed on a front side and a rear side of the emitter (vehicle) for detecting the speed of the approaching vehicle. The present invention utilizes the wireless wave and the Doppler formula to detect the speed variation between the emitter (whereon the electronic device is disposed) and the external object (the approaching vehicle comes from the front side or the rear side). The speed variation is negative, the frequency variation is negative. The external object moves far from the emitter, so the electronic device can execute the speed detection and display the result on the panel for reminder. Besides, the speed variation is positive, the frequency variation is positive. The emitter moves close to the external object, so that the electronic device can execute a comparison of the frequency variation (or the speed variation) and the threshold values, to generate the corresponding warning signal according to the value of the frequency variation (or the speed variation) for reminding the user of the approaching vehicle (the external object), or further to actuate the brake system automatically for preventing the hit accident. The application program is not limited to the above-mentioned embodiment, such as generating the warning signal or actuating the brake system, and depends on design demand.

Comparing to the prior art, the electronic device of the present invention can overcome drawbacks of the conventional vehicle operation recorder. The present invention not only can record the environment information by image and sound, but also can simultaneously detect the speed of the approaching vehicle, so as to generate the warning signal or to actuate the brake system for the proper safety protection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting a vehicle's speed, the method comprising:
   a wireless signal transceiver outputting a detecting wave;
   the wireless signal transceiver receiving a reflecting wave from an external object when the external object passes through a covering range of the detecting wave;
   a control unit calculating a frequency variation between the detecting wave and the reflecting wave; and
   the control unit reading a table for executing an application program according to the frequency variation and information of the table, wherein a brake system of an emitter is actuated when the frequency variation is greater than a second threshold value of the table, and the brake system is accordingly shut down when the frequency variation is varied to be smaller than the second threshold value during actuation of the brake system.

2. The method of claim 1, wherein the control unit reading the table for executing the application program according to the frequency variation and the information of the table comprises:
the control unit driving the emitter to output a warning signal when the frequency variation is positive.

3. The method of claim 2, wherein the control unit reading the table for executing the application program according to the frequency variation and the information of the table further comprises:
the control unit calculating a speed variation between the external object and the emitter outputting the detecting wave by a Doppler formula;
the control unit reading a moving speed of the emitter from a processor of the emitter; and
the control unit calculating and driving a panel to display a moving speed of the external object according to the speed variation and the moving speed of the emitter.

4. The method of claim 2, wherein the table comprises the second threshold value and a first threshold value, a step of outputting the warning signal comprises:
driving the emitter to generate an acoustic wave or an optical wave when the frequency variation is greater than the first threshold value and smaller than the second threshold value; and
decelerating a moving speed of the emitter when the frequency variation is greater than the second threshold value;
wherein the second threshold value is substantially greater than the first threshold value.

5. The method of claim 4, wherein a frequency or an intensity of the acoustic wave and the optical wave is adjusted according to a value of the frequency variation.

6. The method of claim 1, wherein the control unit reading the table for executing the application program according to the frequency variation and the information of the table comprises:
the control unit calculating a speed variation between the external object and the wireless signal transceiver outputting the detecting wave by a Doppler formula when the frequency variation is negative;
the control unit reading a moving speed of the emitter from a processor of the emitter; and
the control unit calculating and driving a panel to display a moving speed of the external object according to the speed variation and the moving speed of the emitter.

7. The method of claim 1, wherein the table comprises a plurality of threshold values and a plurality of application programs, each application program is executed when the frequency variation is within a range of the corresponding threshold value.

8. The method of claim 7, wherein the plurality of application programs comprises functions of generating an acoustic wave or an optical wave by an emitter with detecting wave transmission, and decelerating a moving speed of the emitter.

9. An electronic device disposed on an emitter, the electronic device being capable of detecting a moving speed of an external object, the electronic device comprising:
a wireless signal transceiver for outputting a detecting wave and for receiving a reflecting wave from an external object when the external object passes through a covering range of the detecting wave;
a memory module for storing a table, the table comprising a plurality of threshold values and a plurality of application programs; and
a control unit electrically connected to the wireless signal transceiver and the memory module, and further coupled to the emitter in an external connection, the control unit calculating a frequency variation between the detecting wave and the reflecting wave, reading the table and executing the corresponding application program according to the frequency variation and the threshold value;
wherein each application program is executed when the frequency variation is within a range of the corresponding threshold value, a brake system of the emitter is actuated when the frequency variation is greater than a threshold value of the table, and the brake system is accordingly shut down when the frequency variation is varied to be smaller than the threshold value during actuation of the brake system, and the electronic device is a vehicle operation recorder.

10. The electronic device of claim 9, wherein the control unit drives the emitter to output a warning signal when the frequency variation is positive, or reads a moving speed of the emitter from a processor of the emitter for calculating the moving speed of the external object by a Doppler formula.

11. The electronic device of claim 10, wherein the control unit drives the emitter to generate an acoustic wave or an optical wave and to decelerate a moving speed of the emitter according to the frequency variation and the threshold value when the frequency variation is positive.

12. The electronic device of claim 10, wherein a frequency or an intensity of the acoustic wave and the optical wave is adjusted according to a value of the frequency variation.

13. The electronic device of claim 9, wherein the control unit reads a moving speed of the emitter from a processor of the emitter for calculating the moving speed of the external object by a Doppler formula when the frequency variation is negative.

14. The electronic device of claim 9, wherein the control unit further drives a panel of the emitter to display the moving speed of the external object.

15. An electronic device disposed on an emitter, the electronic device being capable of detecting a moving speed of an external object, the electronic device comprising:
a wireless signal transceiver for outputting a detecting wave and for receiving a reflecting wave from an external object when the external object passes through a covering range of the detecting wave;
a memory module for storing a table, the table comprising a plurality of threshold values and a plurality of application programs; and
a control unit electrically connected to the wireless signal transceiver and the memory module, and further coupled to the emitter in a built-in manner, the control unit calculating a frequency variation between the detecting wave and the reflecting wave, reading the table and executing the corresponding application program according to the frequency variation and the threshold value;
wherein each application program is executed when the frequency variation is within a range of the corresponding threshold value, a brake system of the emitter is actuated when the frequency variation is greater than a threshold value of the table, and the brake system is accordingly shut down when the frequency variation is varied to be smaller than the threshold value during actuation of the brake system, and the electronic device is a vehicle operation recorder.

16. The electronic device of claim 15, wherein the control unit drives the emitter to output a warning signal when the frequency variation is positive, or reads a moving speed of the emitter from a processor of the emitter for calculating the moving speed of the external object by a Doppler formula.

17. The electronic device of claim 16, wherein the control unit drives the emitter to generate an acoustic wave or an optical wave and to decelerate a moving speed of the emitter according to the frequency variation and the threshold value when the frequency variation is positive.

18. The electronic device of claim 16, wherein a frequency or an intensity of the acoustic wave and the optical wave is adjusted according to a value of the frequency variation.

19. The electronic device of claim 15, wherein the control unit reads a moving speed of the emitter from a processor of the emitter for calculating the moving speed of the external object by a Doppler formula when the frequency variation is negative.

20. The electronic device of claim 15, wherein the control unit further drives a panel of the emitter to display the moving speed of the external object.

* * * * *